United States Patent [19]

Burdick

[11] Patent Number: 5,038,651
[45] Date of Patent: Aug. 13, 1991

[54] DEVICE FOR CUTTING SHAPED HOLES

[76] Inventor: Brett W. Burdick, 16 Country Village La. Clinton, Conn. 06413

[21] Appl. No.: 500,871

[22] Filed: Mar. 29, 1990

[51] Int. Cl.⁵ .............................................. B26D 5/08
[52] U.S. Cl. ..................................... 83/565; 83/745; 33/27.12; 33/562; 33/DIG. 10
[58] Field of Search ............... 409/125, 124, 110, 103, 409/108, 104, 106; 33/27, 12, DIG. 10, 562, 197; 144/144 R; 83/565, 745

[56] References Cited

U.S. PATENT DOCUMENTS 658,711   9/1900   Forker .................................. 83/565
3,537,345 11/1970 Luppino ................................ 83/565

Primary Examiner—Larry I. Schwartz
Assistant Examiner—Robert Schultz
Attorney, Agent, or Firm—Allan M. Shapiro

[57] ABSTRACT

Cutting shaped holes is accomplished by the device by including a foot plate on the part to be cut and a cutting tool which is driven around the foot plate in accordance with the hole shape selected. A template determines size and shape of the hole, and a cutting tool movable on a rotating arm follows the template. The template also controls the position of the cutting tool with respect to the direction of cut so that efficient cutting is achieved.

19 Claims, 3 Drawing Sheets

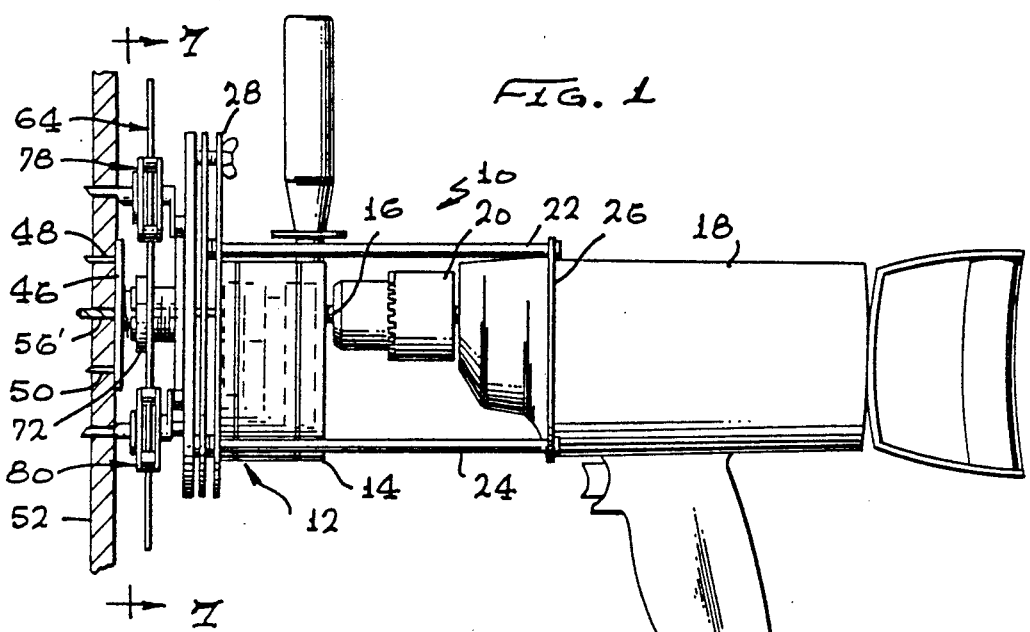
FIG. 1
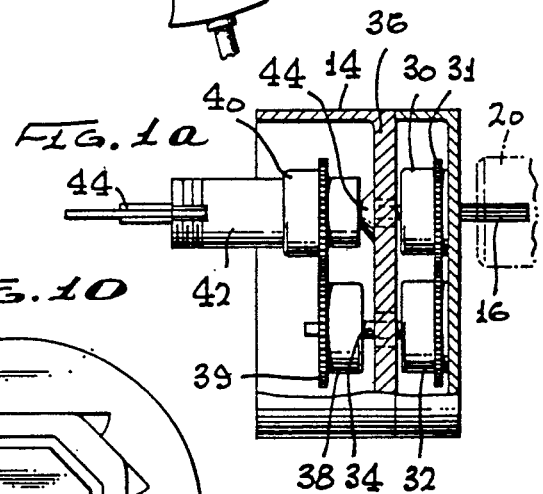
FIG. 1a
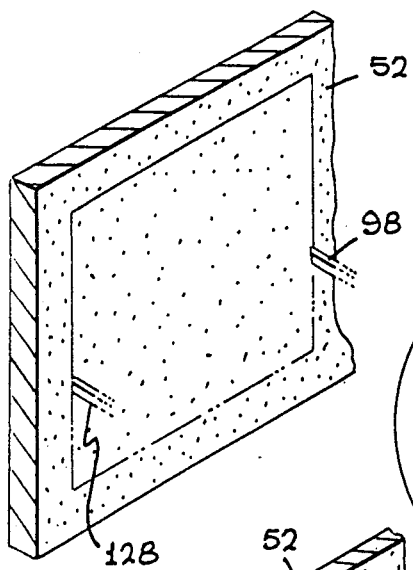
FIG. 2
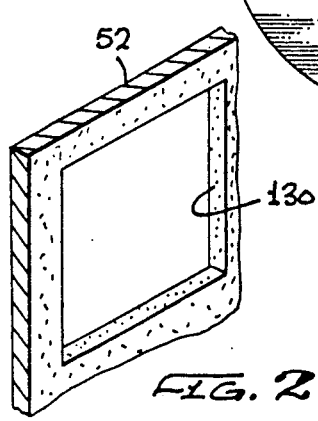
FIG. 2a
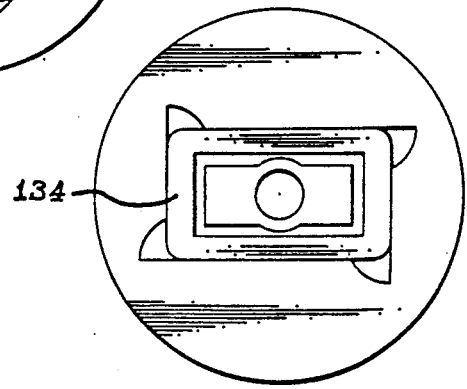
FIG. 10
FIG. 11

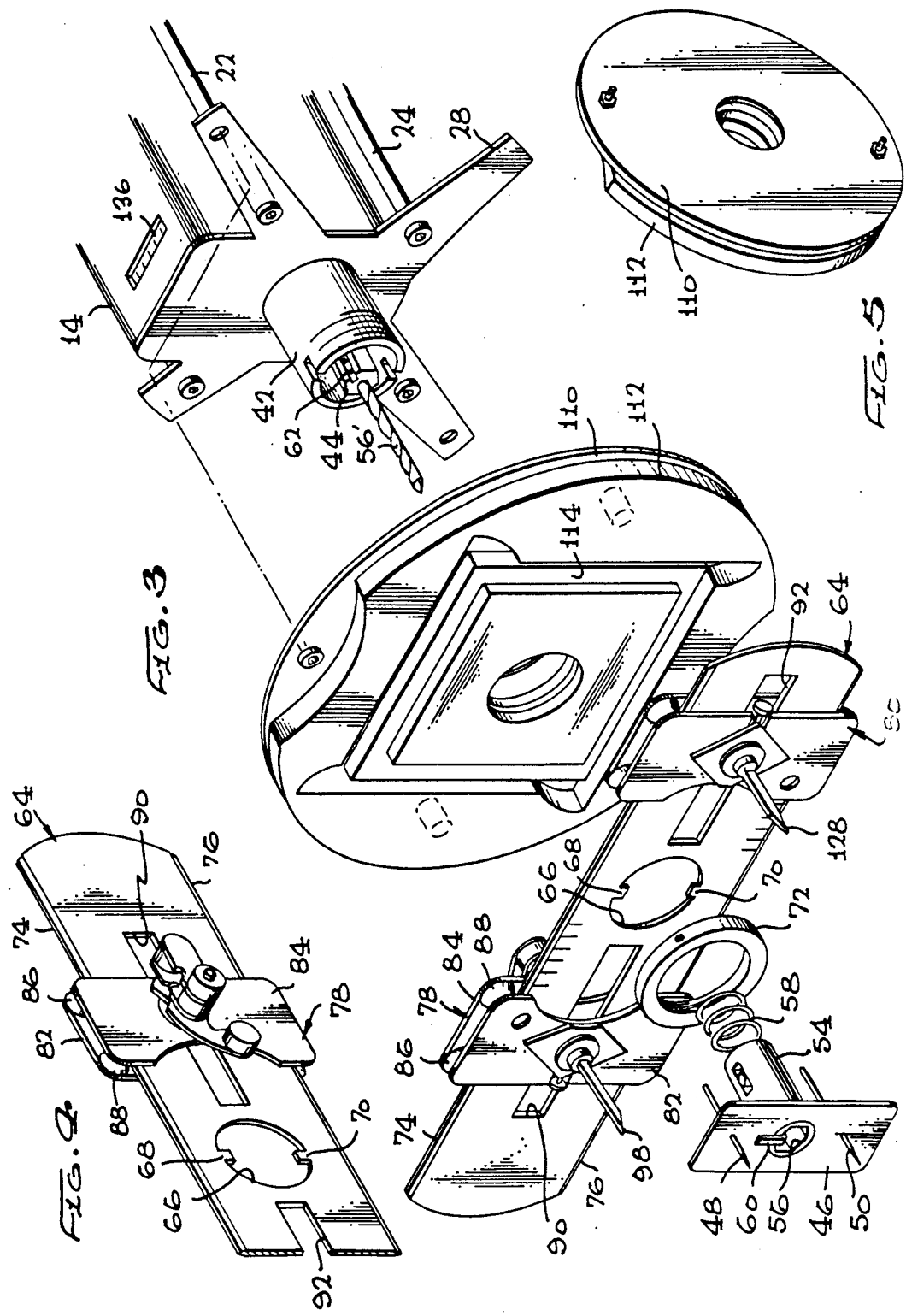

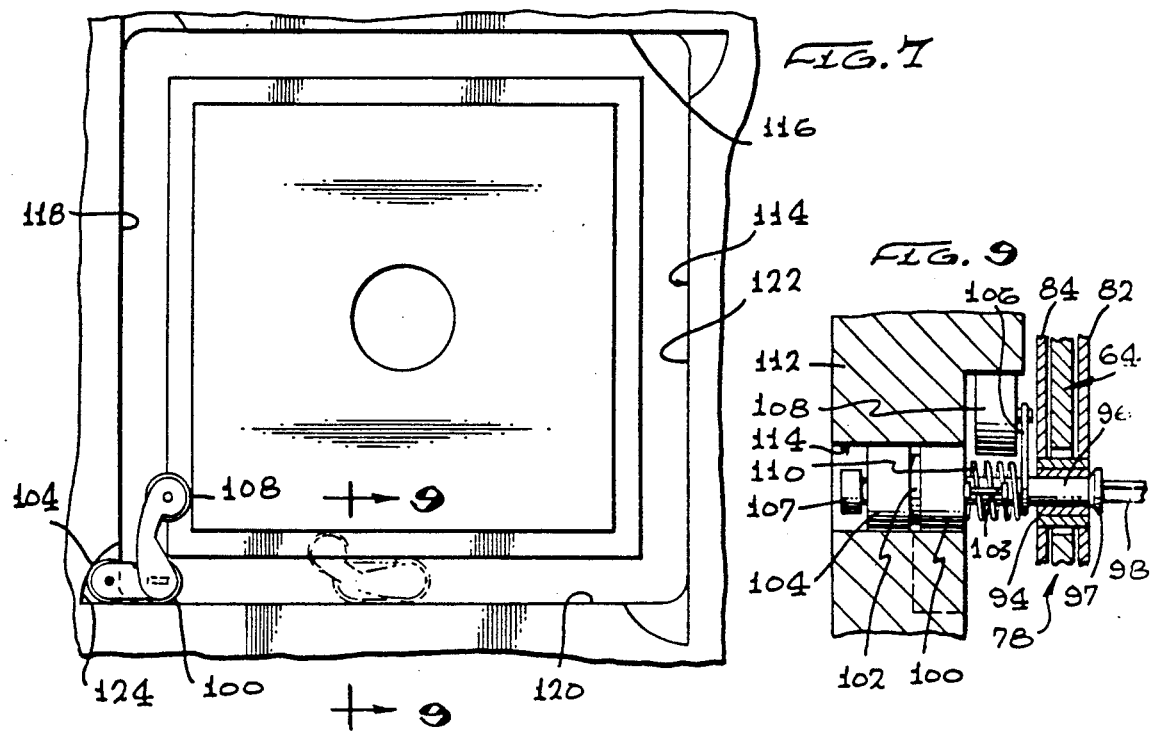
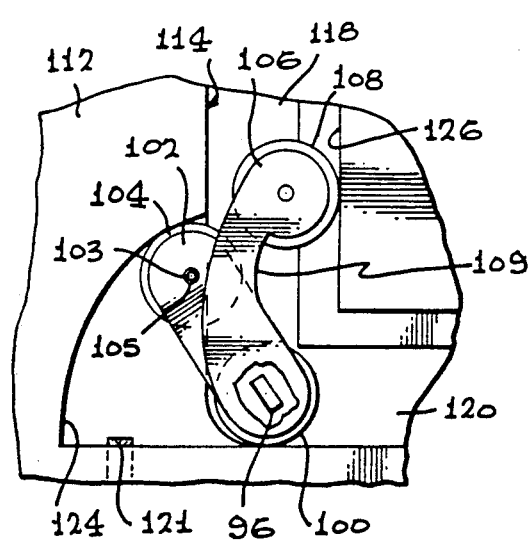
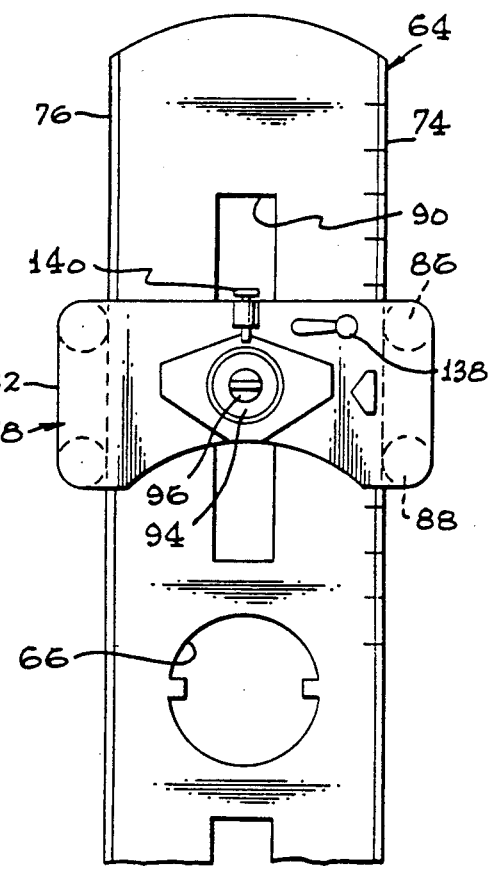

DEVICE FOR CUTTING SHAPED HOLES

FIELD OF THE INVENTION

This invention is directed to a device for cutting shaped holes, and particularly rectangular holes in wallboard to permit access to electrical boxes installed behind the wallboard.

BACKGROUND OF THE INVENTION

Walls are usually built by erecting studding of wood or metal. Electrical wiring extends between the studs and terminates in usually rectangular electrical wall boxes. After the work on the inside of the wall is complete, including electrical, plumbing and insulation work, wallboard is erected and secured to the studs.

Access must be achieved to the electric boxes behind the wallboard. The most usual way of achieving this access is to knock a hole in the wall near the center of the box and use a handsaw to cut out the required opening. The problem with a handsaw is that it is slow and leads to errors. If the opening is sawed too large, the cover plate will not obscure it. Repair of such an overcut requires further time, material and skill. Thus, it is desirable to quickly cut a hole of the required size and shape at the precise position over an electrical wall box to permit access to that box. The device of this invention achieves that result.

SUMMARY OF THE INVENTION

In order to aid in the understanding of this invention, it can be stated in essentially summary form that it is directed to a device for cutting shaped holes wherein a template controls both the size and shape of the hole being cut by a non-rotating cutter, and also controls the direction in which the cutter faces the work.

It is, thus, an object and advantage of this invention to provide a device for cutting shaped holes wherein the size and shape of the opening to be cut are controlled by the template, and a cutter is controlled both in cutter orientation and in path in order to quickly cut the hole.

It is another object and advantage of this invention to provide a device for cutting shaped holes wherein the direction of orientation of the cutter into the cut and the direction of cutter motion are controlled by a template, with the cutter motion around the template being motor-driven.

It is a further object and advantage of this invention to provide a device for cutting shaped holes wherein a template is locked with respect to the panel in which the hole is to be cut so that template orientation with respect to the finished hole is referenced to the panel itself.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side-elevational view of a device for cutting shaped holes in accordance with this invention.

FIG. 1a is an enlarged detail of the gearbox of FIG. 1 with parts broken away and parts taken in section.

FIG. 2 is an isometric view of a panel showing a rectangular hole to be cut therein by a pair of cutters.

FIG. 2a is a similar view of the wallboard on reduced scale showing the cut hole.

FIG. 3 is an exploded isometric view of the device for cutting shaped holes in accordance with this invention.

FIG. 4 is a similar isometric view of the back of the rotating arm, with parts broken away, and showing one cutter carriage mounted thereon.

FIG. 5 is a reduced-scale view of the back of the template.

FIG. 6 is an enlarged view of the front of the cutter arm, with parts broken away.

FIG. 7 is an enlarged view of the template and follower rollers, seen generally along line 7—7 of FIG. 1.

FIG. 8 is an enlarged detail of the corner of the template in FIG. 7.

FIG. 9 is an enlarged section taken generally along line 9—9 of FIG. 7.

FIG. 10 is the front view of another template, suitable for cutting octagonal holes.

FIG. 11 is the front view of yet another template, suitable for cutting rectangular holes.

DESCRIPTION OF THE PREFERRED EMBODIMENT

The device for cutting shaped holes is generally indicated at 10 in FIG. 1. The principal stationary part of the device 10 is frame 12, which includes a gear housing 14. Housing 14 has an input shaft 16 which is rotated by any convenient drive motor. The drive motor may be pneumatic or electric, and hand-cranking is also feasible. In the embodiment shown in FIG. 1, a convenient rotary power source is electric drill 18. The electric drill is conventionally provided with handles for manual manipulation and a switch for control of the motor. Chuck 20 rotates under the control of the user. Frame 12 is conveniently supported on the body of the electric drill 18 by means of studs. Studs 22 and 24, seen in FIGS. 1 and 3, extend between a plate 26 secured on the drill motor and a star plate 28 which forms part of the frame 12. The frame is the stationary member of the device and includes the gear housing. The drive motor is held in stationary relationship with respect to the frame. While an electric drill is shown as attached to the housing 14, a motor of other character may be attached to the right end of the housing 14 or may be positioned within the housing 14.

Housing 14 contains therein drive sprocket 30 fixed on shaft 16. Drive chain 31 engages with sprocket 30 and with idler sprocket 32 which is fixed to idler shaft 34, which is rotatably mounted in the center wall 36 of the gear housing. Idler sprocket 38 is fixed on idler shaft 34 forward of the center wall 36. Idler sprocket 38 has drive chain 39 engaged thereover and with drive sprocket 40, which is fixed on main shaft 42. Sprockets and chains are used instead of gears because of the higher torque capability thereof. The sprocket diameters are such as to provide a reduced rotative speed and higher torque at main shaft 42. Main shaft 42 is tubular and is rotatably mounted on fixed stud 44. It is thus seen that the stud 44 does not rotate with respect to the frame. As is seen in FIG. 3, the forward end of stud 44 is hexagonal. Foot plate 46, which is best seen in FIG. 3, has spikes 48 and 50 thereon extending forward therefrom to engage into wallboard. Wallboard 52 is shown in FIG. 1 as being engaged by the spikes 48 and 50 with the foot plate 46 thereagainst. Foot plate 46 is carried on boss 54 which, in turn, has a hexagonal opening 56 therein to receive fixed stud 44. Thus, the foot plate is non-rotatable with respect to the frame. Drill 56' is mounted in stud 44 and extends out through the foot plate to serve as a centering device in the wallboard, as seen in FIG. 1. Boss 54 is slidably mounted on the fixed stud 44 so that the boss and foot plate 46 can move axially on stud 44. Compression spring 58 is positioned behind boss 54 to urge the boss and foot plate in the leftward direction, as seen in FIG. 1. The sliding motion of the boss onto the stud is required during the cutting process, as will become apparent hereafter. Catch 60 has a hook finger which lies forward of foot plate 46 and has a shank which lies in groove 62 in stud 44. The hook finger of the catch engages the foot plate 46 to restrain it from being pushed off fixed stud 44 after the cutting blades described hereinafter cut through the wallboard 52. The gear box 14 thus serves to provide a rotating concentric main shaft 42 around the fixed stud 44. If the shaft 16 does not rotate at the desired speed or with the appropriate torque, a gear reduction can be employed therein.

Arm 64, seen in FIGS. 3 and 4, has a central opening 66 which fits upon main shaft 42. Ears 68 and 70 fit within corresponding slots in the front of shaft 42. When the ears bottom in the slots, the axial position of arm 64 on the shaft is determined. Threaded collar 72, axially and rotatably fixed on the shaft, engages on the front of arm 64 and on threads on shaft 42 to lock the arm in place.

The edges 74 and 76 of arm 64 are V-shaped to serve as tracks. Bodies 78 and 80 are identical and are mounted on the opposite ends of the arm 64 to move radially in and out on the arm. As is best seen in FIGS. 3 and 4, body 78 has a front plate 82 and back plate 84 which are spaced from each other on four posts in the corners. Rotatably mounted on these posts are rollers which engage the edges of the arm. Rollers 86 and 88 are seen in FIGS. 3 and 4. The rollers are V-grooved to correspond to the shape of the edges of the arm. In this way, the bodies can move radially inward and outward on opposite ends of the arm. Slots 90 and 92 are provided in the opposite ends of the arm because the bodies carries shafts thereon which extend through both the front and back plates.

As is seen in FIG. 9, bearing 94 is secured in the two plates of body 78. Cutter shaft 96 is rotatable in its bearing and extends therethrough. The front end of cutter shaft 96 has a blade holder 97 thereon which, in turn, carries cutter blade 98, which is configured as a narrow chisel so that it cuts through drywall wallboard when it is oriented in the cutting direction and moved in the cutting direction. Different blades can be installed for cutting different types of material. On the opposite side of the body 78 from the cutter, shaft 96 carries guide roller 100 on the axis of shaft 96. Behind guide roller 100, steering roller arm 102 is irrotatably secured to shaft 96, see FIG. 8. Steering roller 104 is rotatably mounted on steering roller arm 102. When the guide roller 100 and steering roller 104 are in a template guide slot, the orientation of the cutter 98 is controlled. In addition, turning arm 106 is rotatably mounted on shaft 96 and carries turning roller 108 rotatably mounted on the outer end thereof. Torque spring 110 is connected between turning arm 106 and shaft 96 to torque shaft 96 in the clockwise direction looking forward.

In order to aid the insertion of steering roller 104 and turning roller 108 into the template groove 114, a latch is provided. Latch pin 103 lies through the pivot shaft 105 of roller 104, see FIGS. 8 and 9. A spring under latch pin head 107 urges the latch pin to the withdrawn position shown in FIG. 9. To latch rollers 104 and 108 in line for insertion into the template groove, the rollers are manually moved to the in-line position, and latch pin 103 is thrust against its spring so that it engages in surface 109 of arm 106. When the rollers are in the template groove, latch pin 103 is released by retracting turning arm 106 from the latch pin. The latch pin spring then withdraws the latch pin.

The position of the bodies 78 and 80 on arm 64 and the orientation of the cutters carried thereon are controlled by means of a template. Template carrier 110, see FIG. 3, is mounted on star plate 28 and, thus, is part of the fixed structure. Template 112 is removably mounted thereon. Templates of various configurations may be employed, as will be described hereinafter. However, for the purpose of initial description, the template 112 is configured to cut a hole which is square. Template 112 is seen in FIGS. 3, 6, 7, 8 and 9. Template 112 has a principal groove 114 therein which is comprised of a straight top leg 116, a straight right leg 118, a straight bottom leg 120, and a straight left leg 122. The legs are of substantially the same length and are arranged at right angles to each other to form a rectangular principal groove which is substantially square. The depth of the groove is sufficient to receive both rollers 100 and 104, as seen in FIG. 9. When both of these rollers are engaged in the principal groove, the orientation of the cutter 98 is fixed. The cutter moves in the clockwise direction (as viewed toward the wallboard 52), and the cutter is held in the forward-facing position by means of the two rollers 100 and 104 in the groove. In this way, efficient cutting is achieved because this is the blade orientation with respect to blade direction of movement, which achieves efficient cutting.

Turning at the corners is achieved by a turning relief recess at each corner. The turning relief recess 124 is shown in FIG. 8, and it is seen in FIG. 7 that the other corner turning relief recesses are identical. When the axis of shaft 96 is exactly at the joining point of the adjacent legs 118 and 120, roller 104 can swing with its steering arm 102 through a clockwise 90 degrees by virtue of the shape of the corner turning relief recess 124. In this way, the cutter is steered from a downward oriented position in which it is located as it comes down right leg 118 to a horizontal orientation as it moves left (looking forward) into bottom leg 120. Roller 104 swings down as a result of the spring torque and engages the bottom wall of the bottom leg 120, as is seen in FIG. 8. In order to quiet the transition and reduce wear, resilient insert 121 in the form of a rubber plug is inserted in a blind hole in the template wall to receive the first shock of the roller 104. Turning roller 108 has its own template track 126, which is parallel to the principal groove 114. As the cutter assembly reaches the corner and the steering roller 104 reaches the corner turning relief recess 124, the spring-mounted turning roller 108 applies the torque necessary to swing the steering roller arm 102 in the clockwise direction so that its steering roller 104 is in line with the new leg 120 of the template groove. In this way, the cutting tool is steered and restrained in the desired cutting direction.

FIG. 2 shows the cutter 98 and its companion cutter 128 moving around a location in wallboard 52 which is to be cut out. As each cutter reaches the corner, it is turned 90 degrees so that the chisel faces forward for careful and accurate cutting. The result is an opening 130 which is defined in size and shape by the principal groove in the template. The opening 130 is particularly useful for access to a double electrical wall box behind the wallboard. FIG. 10 illustrates a template 132 having an octagonal principal groove which is particularly useful for exposing an octagonal electrical wall box behind the wallboard. FIG. 11 illustrates a template 134 which has a rectangular principal groove which is particularly sized and shaped for exposing a single electrical wall box behind the wallboard. Templates with grooves for cutting openings having straight sides and sharp corners are illustrated. The cutting of square holes and rectangular holes has particular utility for access to electrical boxes behind the wallboard. However, for other uses, the device can be used for cutting holes which have three or more straight sides or curved sides in a closed configuration. Curved template grooves and curved wall openings are also possible. Circular holes can be cut with circular templates, and oval or ellipsoidal holes can be cut with corresponding templates. Thus, the device has wide utility in cutting holes of various shapes.

As is seen in FIG. 6, set screw 138 locks body 78 to arm 64. A similar set screw locks the body 80 to the other end of the arm 64 so that the two cutter blades 98 and 128 are at the same radius. Without a template in the device, the device can now cut circular holes. In order to lock the cutter blades in correct orientation for proper cutting, set screw 140 locks the cutter shaft 96 so that it cannot rotate to retain the cutter 98 in the correct orientation for proper cutting. In this way, circular cuts are achieved.

In use, the location of the hidden electrical wall box is determined, as well as its shape and orientation. Drill 56' is passed through the wallboard at the center of the location. In most installations, it is desirable to have the top and bottom walls of the opening level to earth's gravity. To aid in accomplishing this result, a bubble level 136 is mounted on the top of gear box 14. The level is aligned so that, when the top and bottom grooves of the template are level, the bubble level 136 indicates that positioning. This increases the speed at which the template can be aligned. Foot plate 46 is positioned in line with the electrical wall box. The foot plate is pressed against the wallboard 62 with the bubble level indicating level orientation of the top groove of the template so that its spikes 48 and 50 pass into the wallboard to define rotative and lateral positioning of the device 10 for cutting the opening in the desired location. It is understood that the cutting tools 98 and 128 are away from the wallboard 52 by virtue of the spring 58 extending the foot plate. The motor is started, and the cutting tools travel around their paths. While one cutting tool is sufficient, two balance the load and provide for cutting at twice as fast a rate. As the cutters move around their path, as prescribed by the template, the operator moves the frame forward toward the wallboard to move the cutters into cutting contact with the face of the wallboard. Cutting speed axially of the device and perpendicular to the wallboard should be slow at the start to provide a careful cut through the cardboard surface material. The frame 12 and its cutters are advanced toward the wallboard as cutting proceeds until they cut through the back surface. Removal of the core leaves the opening 130. The device 10 is then ready for placement at a new location for cutting of another hole. Should it be desired to change templates, the collar 72 and arm 64 remove to permit interchanging to a different template size and shape. Thereupon, the arm 64, collar 72 and foot plate 46 are replaced so that cutting of the new size and shape hole can proceed.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A device for cutting shaped holes, comprising:
   a frame, a fixed shaft extending from said frame and a coaxial rotating shaft surrounding said fixed shaft;
   means for rotating said rotating shaft;
   a template mounted on said frame, said template having at least one surface defining the size and shape of the hole to be cut;
   an arm mounted on said rotating shaft;
   a body movably mounted on said arm to be rotated by said arm upon rotation of said rotating shaft, said body having a template follower thereon engaged with said template surface and having a cutter blade thereon so that said template follower moves said cutter blade with respect to said arm in accordance with the shape of said template; and
   a foot plate mounted on said fixed shaft, said foot plate engaging a member in which a hole is to be cut by said cutter blade; and said means for rotating being axially rearward of said template, and said arm and said body being axially forward of said template.

2. The device of claim 1 wherein said foot plate has a plurality of pins thereon for engagement in a member to be cut.

3. The device of claim 2 wherein said foot plate is detachably mounted on said fixed shaft.

4. The device of claim 3 wherein said arm is a rectangular arm and has edges thereon, said body having rollers engaging said edges so that motion of said body on said arm along said edges includes radial motion with respect to said rotating shaft.

5. The device of claim 4 wherein said cutter blade is mounted on a cutter shaft and said cutter shaft has said template follower thereon, said template follower being in engagement with said template surface.

6. The device of claim 5 wherein said cutter shaft is rotatably mounted with respect to said body and there is a steering roller arm mounted on said cutter shaft and a steering roller mounted on said steering roller arm, said steering roller engaging on a template surface so as to control the rotational position of said cutter shaft with respect to said body.

7. The device of claim 6 further including a turning arm rotatably mounted on said cutter shaft and a turning roller on said arm, said turning roller engaging on a surface on said template and further including a torsion spring between said turning arm and said cutter shaft to torque said steering roller against a template surface.

8. A device for cutting shaped holes, comprising;
   a frame, a fixed shaft extending from said frame and a coaxial rotating shaft surrounding said fixed shaft;
   means for rotating said rotating shaft;
   a template mounted on said frame, said template having at least one template surface defining the size and shape of the hole to be cut;
   an arm mounted on said rotating shaft; and a body movably mounted on said arm to be rotated by said arm upon rotation of said rotating shaft, a cutter shaft mounted on said body, a cutter blade mounted on said cutter shaft, and a template follower mounted on said cutter shaft, said template follower being in engagement with said template surface; and said means for rotating being axially rearward of said template, and said arm and said body being axially forward of said template.

9. The device of claim 8 wherein said arm is a rectangular arm and has edges thereon, said body having rollers engaging said edges so that motion of said body on said arm along said edges includes radial motion with respect to said rotating shaft.

10. The device of claim 8 wherein said cutter shaft is rotatably mounted with respect to said body and there is a steering roller arm mounted on said shaft and a steering roller mounted on said steering roller arm, said steering roller engaging on a template surface so as to control the rotational position of said cutter shaft with respect to said body.

11. A device for cutting shaped holes, comprising:
a fixed frame;
a template mounted on said fixed frame and having a template surface;
a fixed shaft on said frame extending forward from said frame;
a rotatable shaft positioned for rotation around said fixed shaft, means connected to said rotatable shaft for rotating said rotatable shaft;
an arm mounted on said rotatable shaft, a body mounted on said arm for motion toward and away from said rotatable shaft, guide surfaces on said arm, rollers carried by said body said rollers engaging said guide surfaces on said arm so that said body can radially move on said arm with respect to said rotatable shaft;
a template follower mounted on said body, said template follower being in engagement with said template surface to control the radial position of said body with respect to said rotatable shaft; and
a cutter blade mounted on said body so that, as said rotatable shaft rotates and said body is driven thereby, the radial position of said body and said cutter blade carried thereby is controlled by said template follower on said template surface; and said means for rotating being axially rearward of said template, and said arm and said body being axially forward of said template.

12. The device of claim 11 wherein said cutter blade is rotatably mounted on said body and said cutter blade is contoured so that it has a preferred orientation with respect to the cutting direction for best cutting; and
means connected to said cutter blade and controlled by said template surface for rotationally positioning said cutter blade with respect to said body so that said cutter blade is oriented with respect to the workpiece for efficient cutting.

13. A device for cutting shaped holes, comprising:
a fixed frame;
a template mounted on said fixed frame and having at least one template surface;
a fixed shaft on said frame extending forward from said frame;
a rotatable shaft positioned for rotation around said fixed shaft, means connected to said rotatable shaft for rotating said rotatable shaft;
an arm mounted on said rotatable shaft, a body mounted on said arm for motion toward and away from said rotatable shaft;
a template follower mounted on said body, said template follower being in engagement with said template surface to control the radial position of said body with respect to said rotatable shaft;
a cutter blade mounted on said body so that, as said rotatable shaft rotates and said body is driven thereby, the radial position of said cutter blade is controlled by said template follower on said template surface, said cutter blade being rotatably mounted on said body and being contoured so that it has a preferred orientation with respect to the cutting direction for best cutting, a steering arm fixed with respect to said cutter blade and a steering template follower fixed to said steering arm, said steering follower engaging on said template surface for controlling the angular position of said cutter blade with respect to said body.

14. The device of claim 13 wherein there is a corner turning relief recess on said template surface for receiving said steering template follower at corners of said template surface.

15. The device of claim 14 wherein resilient means is provided for torquing said steering template follower into said corner turning recess.

16. The device of claim 15 wherein said means for torquing comprises a turning arm mounted on a cutter shaft and a turning template follower mounted on said turning arm for engaging a template surface and a torque spring connected between said turning arm and said cutter shaft.

17. The device of claim 16 further including a releasable latch between said turning arm and said steering arm to releasably hold said steering arm in retracted position.

18. The device of claim 13 wherein said template has a resilient member mounted on said template surface, with said resilient member positioned to be engaged by said steering template follower to reduce impact as said steering template follower goes around a corner on said template surface.

19. A device for cutting shaped holes, comprising:
a fixed frame;
a template mounted on said fixed frame and having a template surface;
a fixed shaft on said frame extending forward from said frame;
a rotatable shaft positioned for rotation around said fixed shaft, means connected to said rotatable shaft for rotating said rotatable shaft;
an arm mounted on said rotatable shaft, a body mounted on said arm for motion toward and away from said rotatable shaft;
a template follower mounted on said body, said template follower being in engagement with said template surface to control the radial position of said body with respect to said rotatable shaft;
a cutter blade mounted on said body so that, as said rotatable shaft rotates and said body is driven thereby, the radial position of said cutter blade is controlled by said template follower on said template surface; and
means for selectively locking said body to said arm for holding said body and said cutter blade at a fixed radius so that, in the absence of a template, said device can cut a circular hole; and said means for rotating being axially rearward of said template, and said arm and said body being axially forward of said template.

* * * * *